United States Patent Office 3,375,212
Patented Mar. 26, 1968

3,375,212
MICROCELLULAR POLYMERIC STRUCTURE
Willard Hallam Bonner, Jr., Gordon Heights, Del., assignor to E. I. du Pont de Nemours and Company, Wilmington, Del., a corporation of Delaware
No Drawing. Continuation-in-part of application Ser. No. 302,721, Aug. 16, 1963. This application Feb. 14, 1967, Ser. No. 615,884
7 Claims. (Cl. 260—2.5)

ABSTRACT OF THE DISCLOSURE

A metastable, collapsed, relatively dense microcellular foam structure composed of a polymer having a glass transition temperature of at least 40° C. The closed cells of the structure contain an impermeant inflatant which provides an osmotic driving force for entry of air and consequent expansion of the foam. However, the structure having been set in the collapsed condition, the wrinkled cell walls are rigid and resist expansion until temperature of the sample is raised above the glass transition temperature of the polymer, or until the sample is treated with a plasticizer.

This application is a continuation-in-part of application Ser. No. 302,721, filed Aug. 16, 1963, now abandoned.

Background of the invention

This invention relates to closed-cell foams of organic polymers. More particularly it relates to collapsed microcellular structures which are metastable at room temperature in that they are adapted to be self-reinflated by a simple heat and/or plasticizer treatment.

Many varieties of foams of organic polymers have been provided by the prior art. A particular species of such foams which has low density, closed cells, and is resilient, called herein microcellular structures, has found use in various applications ranging from shock protection and load support to thermal insulation. Since such foams can be produced in sheet, filament or other shaped or bulk form, these microcellular structures are well adapted to a great variety of end uses.

Notwithstanding their advantageous features, experience has shown that for certain purposes the utility of these materials may be frequently restricted by the salient functional features which characterize their uniqueness. Thus in particular, the low density/high bulk of the microcellular structures which is especially desirable for many end uses, creates a distinct cost disadvantage in storage and in transportation and handling operations. In the case of shipments between distant geographical locations, the expenses involved with extremely light weight bulky materials can readily become prohibitive. While seemingly these problems might partially be obviated by simply producing the microcellular structures at the location where they are to be utilized, the expense and complexity of the necessary manufacturing equipment would ordinarily make such practice impractical.

Summary of the invention

Accordingly it is an object of the invention to provide microcellular structures which can be stored and shipped in a substantially collapsed, relatively dense form, and which can be self-reinflated to a low density pneumatic form at the point of use. It is also an object to provide substantially collapsed microcellular structures which are stable in air at room temperature and which can be self-reinflated by a heating step. It is a still further object to provide collapsed microcellular structures which can be self-reinflated to a predetermined shape and size, or which can be self-reinflated within a confining volume such that the structure expands to take on the shape of that volume to produce the equivalent of a foamed-in-place material. Other objects will be apparent from the remainder of the specification and claims.

In particular, the invention achieves these objectives by providing a metastable self-reinflatable microcellular structure composed of a high molecular weight synthetic organic polymer having a glass transition temperature of at least 40° C. wherein the structure has a major proportion of closed, at least partially collapsed but unruptured polyhedral cells defined by air permeable walls having a thickness of less than 2 microns with essentially all the polymer constituting cell walls, said cellular structure being further characterized as being self-reinflatable to less than one-half its collapsed density without substantial stretching of the cell walls by having an $N_c \cdot s \frac{3}{2}$ product greater than about 30, wherein $N_c$ is the number of cells per cc. in the collapsed structure and s. is the average cell surface area in square centimeters, said cells containing an impermeant inflatant whose permeability coefficient for diffusion through said walls is essentially zero, said impermeant inflatant being capable of generating a vapor pressure of at least 30 mm. Hg. at a temperature below the softening point of the said polymer.

The foregoing microcellular structures are self-reinflatable in that the volume of gas within the cells thereof, hence also the relative bulk of the structures, can be markedly increased, e.g. simply by exposure to air at an elevated temperature. On the other hand, the collapsed structures do not reinflate in air so long as they are maintained below the glass transition temperature of the polymer. The inflatable characteristics of the products of the invention are largely the result of a critical selection of polymer/impermeant inflatant combinations as hereinafter described.

In one embodiment, the process of the invention involves extruding a polymer solution under such conditions to produce an expanded or inflated microcellular structure which quickly and, preferably, spontaneously collapses. In another embodiment, a preformed microcellular structure is bathed in a mixture of permeant and impermeant fluids which replace the initial gaseous contents of the cells. On removal from the bath, the permeant fluid (plasticizer) evaporates and diffuses out of the cells and the structure is collapsed by the external pressure of the atmosphere. In either embodiment, the collapsed structure retains in each cell a quantity of the impermeant inflatant which creates an osmotic driving force for air to diffuse into the cells and reinflate the structure. However, when the structure has been set in the collapsed condition, the rigid nature of the crumpled and buckled cell walls of the resulting structure, at temperatures below the glass transition temperature of the polymer, Tg, effectively resists an increase in the volume of the collapsed cells. Subsequently, when the structure is heated to temperatures above the polymer Tg or when the structure is treated with a plasticizer for the polymer, to lower Tg for the system below the temperature of the sample, the cell walls no longer possess sufficient rigidity to withstand the osmotic driving force. Accordingly air from the atmosphere osmotically diffuses into the cells to dilute the impermeant inflatant. Upon prolonged exposure inward diffusion of air will continue until a fully reinflated structure is obtained. Alternatively any intermediate degree of inflation can be achieved by simply lowering the temperature of the structure to below Tg before full inflation is effected.

It will be apparent from the foregoing that the invention provides a simple and highly effective means for largely overcoming the costly and cumbersome problems heretofore associated with the handling, storage and transportation of microcellular structures. Significantly, no special precautions needs be observed in those operations (except, of course, for avoiding excessively high temperatures) and no extraordinary packaging steps are required. As a further advantage of importance for many purposes, the collapsed air inflatable structures are adapted to be expanded in place to produce articles of a desired shape.

Microcellular structures are desirably produced by the extrusion of a solution containing a high molecular weight synthetic organic polymer having a Tg above 40° C., an impermeant inflatant, and an activating liquid for which the polymer is highly permeable. The solution, maintained at a temperature above the boiling point of the activating liquid and a pressure substantially above atmospheric pressure, is extruded through an orifice into a region of lower pressure and temperature, normally room temperature at about one atmosphere. Immediately upon extrusion into the low pressure and temperature region, substantially all of the activating liquid evaporates adiabatically. As a result, a large number of tiny vapor bubbles, usually at least about $10^5$ per cc., are created in the solution and sufficient heat is absorbed to lower the temperature of the confining polymer below its softening point. This step occurs very rapidly, usually in less than $10^{-2}$ seconds.

Within a short period of time, usually a few seconds, the structure will partially collapse owing to condensation of the activating liquid and/or diffusion thereof through the cell walls to escape from the structure. By maintaining the structure in a collapsed condition until a temperature is reached below the polymer Tg and the cell walls have attained a set crumpled condition, inward diffusion of air and any tendency for re-expansion to occur are thus avoided. In some cases, a high vapor pressure bubble "nucleation assistant" is desirably included in the polymer solution to increase the number of bubbles and resulting cells by increasing the internal pressure and lowering the surface tension of the solution.

The ability of the collapsed microcellular structures to be capable of self-reinflation depends not only upon the particular configuration and construction of the cells but also upon the interaction of the confined impermeant inflatant and the synthetic polymer which forms the cell walls. Still an additional factor which contributes to the self-reinflatable characteristic involves the permeant nature of air as a post-inflation atmosphere; more particularly the ability of air to diffuse into the cells of the structure while the impermeant inflatant is retained therein. In this respect it is to be understood that the so-called "air-permeability" property of the cell walls of the structures of the invention is attributed not to porosity in the sense of openings, but rather to the ability of the walls to selectively permit diffusion therethrough of certain vapors. In effect the walls are semi-permeable such that air will osmotically diffuse from a high air partial pressure side of a wall through the wall to a low air partial pressure side of that wall until the respective fugacities are equal. On the other hand, osmotic diffusion through the walls by a highly impermeant gas will be restrained irrespective of whether or not such a partial pressure differential exists.

With regard to the microcellular structure of the products of the invention, substantially all of the polymer is present as filmy elements whose thickness is less than 2 microns, preferably under 0.5 micron. These filmy elements constitute the walls of the polyhedral-shaped closed cells. The term "drained foam" is aptly descripive of such microcellular structures. The apparent density of the microcellular products is between 0.5 and 0.005 g./cc. The number of cells per cc. in expanded condition, Ni, is desirably at least $10^3$, although values of $10^5$ or greater are preferred.

The cell wall thickness can be determined by microscopic examination of cross sections. With a deflated sample such measurements are facilitated by first reinflating the sample. Thus 20–60 micron thick sections may be cut from a frozen sample with a razor blade. Large cell (>50 microns) samples are frozen directly in liquid nitrogen. Smaller celled samples are preferably "imbedded" in water containing a detergent, and then frozen and sectioned. The cells are found to exhibit a general polyhedral shape, similar to the shape of the internal bubbles in a foam of soap suds. For very thin walled samples (<1 micron), the wall thickness is preferably measured with an interferometer microscope. A layer of the sample is peeled off by contact with "Scotch Tape." The layer is freed from the tape by imersion in chloroform and subsequently placed on the stage of the microscope for measurement.

It is characteristic of an essential to the products of this invention that the cells be of the closed variety and be unruptured even in a collapsed condition. By closed is meant that at least a major proportion by number of cells in any microcellular sample possess a plurality of defining walls, i.e. unruptured walls, which wholly encapsulate an inner space or void. For practical purposes mere visual or microscopic examination will often readily reveal whether or not a particular cellular structure predominates in closed or open cells. Particularly this is true in the case when the identity of the polymer and the conditions of cell formation are known. Otherwise the closed-cell content of a yieldable sample may be determined by the gas displacement method of Remington and Pariser, "Rubber World," May 1958, p. 261, modified by operating at as low a pressure differential as possible to minimize volume changes of the yieldable closed cells. Those structures which are in a collapsed condition are recognizable as such because of their ability to be post-inflated when osmotic diffusion of air thereinto is no longer restrained. Even repeated steps of inflation and deflation performed upon a given sample fail to destroy or rupture a significant number of cell walls.

The polymers employed in accordance with the invention are members of the class of high molecular weight synthetic polymers having a Tg above 40° C., e.g. polyamides such as polyepsiloncaproamide (Tg=50° C.), polyesters such as polyethylene terephthalate (Tg>69° C.), poly(vinyl chloride) (Tg=75° C.), etc. Since the polymer walls of the microcellular structures are film-like with a thickness of les sthan 2 microns, the polymer must accordingly be of at least film-forming molecular weight.

A further requirement of the polymer relates to the strength and resiliency which cell walls thereof impart to the microcellular structure. Thus upon heating the polymer to a temperature above its Tg, it must impart sufficient strength to the structure that the particular cellular nature thereof not be destroyed upon inflation, e.g. so as to resist rupture or a significant stretching of the cell walls. For this reason the polymer should have a yield strength of at least 1000 p.s.i. as measured by the test method of ASTM D–638–58. On the other hand, for inflation to occur such that maximum bulk values are obtained, the polymer composed structure must be such that in expanded condition it be "yieldable," e.g. resilient such that substantial deformation occurs under internal-external pressure differentials, meaning differences, of one atmosphere or less (since this is the order of magnitude of the pressure differentials available for collapse and re-inflation). By substantial deformation is meant that the microcellular structure in expanded condition, i.e. having an internal pressure of at least about one atmosphere with few if any buckles and wrinkles in the cell walls, is yieldable such that its volume can be compressed by at least 10% under a load of 10 pounds per square inch sustained for a period of 1 second with recovery of at least about 50% of its original volume on release of the load. Structures which do not compress to that extent are entirely too rigid and hence do not afford a sufficient degree of resiliency to respond to pressure differentials. Moreover, if the sample does not sufficiently recover after release of the load, then it is not sufficiently flexible to resist fracturing and rupturing of the cell walls.

An essential feature of the polymer which constitutes the cell walls is that it exhibits selective permeability to different gases; in particular, be permeable above the polymer Tg with respect to air but less permeable with respect to impermeant inflatant vapors at the same temperature. Without this feature efforts to achieve full expansion would be unsuccessful for the reason the inflatant would be prematurely lost before sufficient air had entered the cells. The polymers suitable for use in preparing the cellular structures of this invention must have a reasonable permeability to air below the polymer softening temperature of at least $10^{-13}$ cc.*/cm.$^2$ †/sec./cm.‡/cm. Hg.§

Particularly preferred, as having an excellent combination of strength, yieldability, permeability, modulus, toughness, and other properties, is the class of ultramicrocellular foams as described in U.S. Patent 3,227,664, when these are prepared in closed-cell form from crystalline polymers having Tg>40° C. The ultramicrocellular foams are microcellular structures composed of crystalline polymers, the cell walls exhibilting uniform texture and uniplanar orientation.

A substantially collapsed microcellular structure containing a quantity of impermeant inflatant will tend to self-reinflate when exposed to an atmosphere of a relatively permeant gas such as air, since an osmotic potential exists for the external gas to permeate the cells and build up its internal fugacity to equal its external fugacity. Because the original inflatant is impermeant, the external gas (air) will thus tend to diffuse into the cells until its internal partial pressure is essentially one atmosphere, and the total internal pressure will hence become greater than 1 atmosphere. This net influx of gas ordinarily results in an expansion or re-inflation of the initial partially collapsed structure.

In accordance with the present invention, it has been discovered that by a judicious selection of components a partially collapsed structure containing a quantity of impermeant inflatant can be prepared which is metastable, i.e. will remain collapsed indefinitely until a suitable stimulus triggers spontaneous self-reinflation to a fully inflated form. In such a structure, the osmotic self-reinflation driving force is counter-balanced by the mechanical rigidity of the crumpled cell walls as long as the material is maintained below its Tg. The origin of the mechanical restraint resides in the high modulus of the crumpled walls with perhaps some contribution from light surface-bonding between internal crumpled cell faces. In any event, the osmotic inflation force prevails over the mechanical restraint when the glass transition temperature of the sample is exceeded, and the sample reinflates to become stable in fully inflated form. The technique for exceeding Tg of the sample to trigger self-reinflation involves simply heating the structure from ambient temperature to a temperature above Tg, or alternately exposing the structure to a sufficient quantity of a plasticizer for the polymer so that Tg of the polymer/plasticizer system is reduced below ambient temperature. Concurrent exposure of the sample to air results in a net transfer of gas into the cells and self-inflation of the structure. This process can occur quite rapidly, e.g. within a few minutes. Caution should be observed not to exceed Tg by too great an amount, since although the resistance of the walls to reinflation would be further reduced and the rate of inward air diffusion would be increased, the rate of loss of the impermeant inflatant also increases, and in general it is desirable to minimize this latter feature.

The function of the impermeant inflatant contained within the cells of the products of the invention is to afford an osmotic driving force which, upon exposure of the microcellular structure to the atmosphere at an elevated temperature, will cause inflation of the structure. For the structure to be storage stable in the atmosphere at room temperature, the inflatant must be "impermeant" by which is meant not only that its permeability coefficient for diffusion through the cell walls be lower than that of air (e.g. a thousand-fold lower) but also that such permeability coefficient be essentially zero; that is, the inflatant must be incapable of permeating the same cell walls at room temperature, e.g. below 40° C., at such a rate that ½ or more thereof will escape to an air atmosphere by diffusion within 1 month's time. Several impermeant inflatants having permeability coefficients of the order of $10^{-16}$ c.g.s. units have been found to meet the foregoing retention requirements. These restrictions guarantee, first, that the inflatant will be incapable of permeating the cell walls, e.g. outwardly from the sample, as fast as air can permeate the cell walls, e.g. into the sample, for otherwise full inflation of the cells could not be achieved upon heating the sample and exposure to an air atmosphere. Secondly, they guarantee that the metastable collapsed structure retain its inflation activator (the impermeant inflatant) for a reasonable storage period. Necessarily the inflatant must not be a solvent for the polymer under such conditions of temperature and pressure that the sample will be exposed to following discharge from the extrusion orifice.

The minimum quantity of impermeant inflatant contained in each cell in of signficance in realizing an adequate osmotic driving force to obtain reliable and reasonably rapid self-inflation to the fullest extent. Thus a major number of the cells should contain at least some quantity of the inflatant. Since the inflatant must exist in a gaseous condition to create an osmotic driving force, it must be either a gas at room temperature or be capable of vaporizing at a temperature below the melting point of the synthetic polymer defining the walls. In practice it has been found that the inflatant must be capable of generating a vapor pressure of at least about 30 mm. Hg at some temperature below the polymer softening point in order to reliably provide well defined cavities into which the external air will diffuse in reasonable periods of time. If the vapor pressure of the impermeant inflatant in the partially collapsed cells is at least about 30 mm. between room temperature, and the polymer Tg, the structure will normally self-inflate in air upon warming the sample to the polymer Tg. However, impermeant inflatants whose vapor pressures are less than 30 mm. between room temperature and the polymer Tg may also be successfully employed by heating the structure beyond the polymer Tg but below the polymer softening point.

Higher internal inflatant pressures are of course operable, and are in fact preferred, particularly when the confining cellular structure has walls near the upper thickness limit (2 microns) or when the polymer comprising the walls possesses a high flexural modulus (above 100,-000 p.s.i.) at room temperature. The practical upper limit of internal inflatant pressure is that value beyond which the crumpled cell walls can no longer restrain the sample against self-reinflation even though the temperature be maintained below Tg for the polymer in question. If this limit is exceeded the collapsed sample is of course no longer metastable at room temperature.

The rate of permeation for a gas through a given polymer increases as its diffusivity and solubility increase. Accordingly, candidates for impermeant inflatants should have as large a molecular size as is consistent with the required 30 mm. minimum vapor pressure, and have little solvent power or affinity for the confining polymer cell walls. A preferred class of such inflatants is exemplified by compounds whose modecules have chemical bonds different from those found in the confining polymer, a low dipole moment, and a very small atomic polarizability. Furthermore, it is advantageous, though not necessary, that the inflatant be a high vapor pressure solid or liquid ---
* Cc. of gas at STP.
† Cm.$^2$ of surface.
‡ Cm. of sample thickness.
§ Pressure of difference across sample.

under ambient conditions in order that small quantities of solid or liquid phase inflatant may be present in each partially collapsed cell, in addition to the impermeant inflatant vapor. For such systems the inflatant vapor is replenished from the solid or liquid inflatant "reservoir" as the collapsed structure inflates, thus maintaining the full osmotic driving force up through the stage of full inflation. Materials which are non-gaseous at room temperature and atmospheric pressure are preferred since for a given weight they occupy less volume; hence, the bulk of collapsed structures can be appropriately minimized.

Suitable impermeant inflatants according to the invention are represented by sulfur hexafluoride and saturated aliphatic and cycloaliphatic compounds having at least one fluorine to carbon covalent bond and wherein the number of fluorine atoms exceeds the number of carbon atoms. Preferably the saturated aliphatic and cycloaliphatic compounds are, respectively, perhaloalkanes and perhalocycloalkanes in which at least 50% of the halogens are fluorine. Although the aliphatic and cycloaliphatic inflatants may contain ether-oxygen linkages, they are preferably free of nitrogen atoms, carbon to carbon double bonds and reactive functional groups. Specific examples of inflatants include sulfur hexafluoride, 1,1,2-trichloro-1,2,2-trifluoroethane, sym-dichlorotetrafluoroethane, perfluorocyclobutane, perfluoro-1,3-dimethylcyclobutane and perfluorodimethylcyclobutane isomeric mixtures. Mixtures of two or more inflatants can often be used to advantage.

Aside from the foregoing characteristics, it will be understood that the impermeant inflatants must be inert, i.e., be thermally stable under extrusion conditions, and chemically and hydrolytically stable under ambient conditions. For certain uses it will be recognized that toxic compounds should be avoided.

The impermeant inflatant may be introduced into the closed cells of the microcellular structures by two methods. In the first method the impermeant inflatant may be present as one component of the original super-heated solution from which the microcellular structure is generated, the other components comprising at least the polymer and an activating liquid (solvent/blowing agent). Flash evaporation of the solution which occurs on sudden reduction of the confining pressure (as on extrusion through an orifice into the atmosphere) generates and quenches the foam, leaving a quantity of the impermeant inflatant trapped within each cell. In order to produce spontaneously collapsed, self-reinflatable microcellular structures, a judicious selection of impermeant inflatant and activating liquid must be made to ensure that a collapsed structure is initially obtained. To this end it is desirable to select an activating liquid which will quickly permeate the cell walls before being fully replaced by air from the atmosphere. For this technique the activating liquid should be one whose vapors have a permeability at least twice that of air through the selected polymer upon emerging from the extrusion orifice. Alternatively the structure may be extruded into an amosphere of a relatively impermeant gas to facilitate outward diffusion of the activating liquid and prevent inward diffusion of air or other gases. In the event a gaseous or liquid nucleation assistant such as carbon dioxide or nitrogen is employed to give increased nucleation, it too must be highly permeant or otherwise incapable of preventing collapse of the extrodate. Certain non-fluid nucleation assistants such as the silicates which remain as solid particles in the produrt do not, of rourse, impair spontaneous deflation.

In the second method the impermeant inflatant is introduced into the closed cells of a preformed microcellular structure by temporarily plasticizing the polymeric cell walls with a volatile plasticizer. Thus, the structure is immersed in a plasticizer/impermeant inflatant fluid mixture until the impermeant inflatant penetrates the cells, and then the plasticizer is removed, e.g., volatilized, as by "drying" the sample in an atmosphere of the impermeant inflatant, or by a brief heat treatment of the sample while it is temporarily mechanically restrained (to prevent premature air reinflation), thus leaving the inflatant trapped in the cells. If the plasticizer is selected by the same criteria described above for the activating liquid, an initially spontaneously collapsed structure will result.

In the case of either method, the initially spontaneously collapsed structure may need to be restrained from spontaneous air-self-reinflation until the walls of the cells become set in collapsed configuration, e.g. until all the residual activating liquid or plasticizer has escaped. This may be accomplished for example by temporary mechanical restraint of the collapsed structure against reinflation, or by "drying" the structure in an atmosphere of the impermeant inflatant (so that air is denied access to the collapsed structure). Depending upon the choice of polymer, a few minutes to several days will be required before the set condition is adequately realized. In any event, once the collapsed structure has become set (e.g. fully "dried"), it will remain collapsed even on exposure to air, until the modulus of the wrinkled walls is decreased, either by raising their temperature above Tg of the polymer or by replasticizing the walls.

The collapsed microcellular structures of the invention are self-inflatable to less than one-half their collapsed density by having an $N_c \cdot s^{3/2}$ product greater than 30, wherein $N_c$ and $s$ are as hereinbefore defined. Fulfillment of this limitation in effect ensures that the cells are in a sufficiently collapsed condition to be post-expandable to at least twice their collapsed volume without substantial stretching of the cell walls.

It should be noted that the expression $N_c \cdot s^{3/2} > 30$ is essentially independent of cell geometry so long as the cells are polyhedral and have film-like walls of the maximum thickness values specified herein. In practice the values of $N_c$ and $s$ need not be determined directly for cellular samples but rather can be calculated from other known or determinable factors, e.g.:

$$s = \frac{\rho_m}{\rho_0} \cdot \frac{2}{tN_m}$$

and $$N_c = N_i \cdot \frac{\rho_c}{\rho_i} = N_m \cdot \frac{\rho_c}{\rho_m}$$

wherein:

$s$ is the average cell surface area in cm.$^2$, $\rho_m$ is the average density of the foam sample at any convenient degree of inflation, $m$, $\rho_0$ is the bulk polymer density, $t$ is the average cell wall thickness in cm., $N_m$ is the number of cells per cc. in the sample at the same degree of inflation, $m$, $N_c$ is the number of cells per cc. in the sample in a collapsed condition, $N_i$ is the number of cells per cc. in the sample in inflated condition, $\rho_c$ is the density of the sample in collapsed condition, and $\rho_i$ is the density of the sample in inflated condition.

When these definitions are inserted in the previous inequality relation characterizing collapsed cellular structures, simple algebraic manipulation yields:

$$\frac{\rho_c^2}{\rho_0^3 t^3} \cdot \frac{\rho_m}{N_m} > 112$$

This provides an entirely equivalent definition of collapsed cellular structures in which only directly observable parameters appear, and which therefore is ordinarily more convenient to employ.

Values of $\rho$ for a sample of a microcellular structure at any degree of inflation are conveniently obtained by measuring the volume of water that a given weight of sample displaces. Values of $N_m$ can be determined by microscopic examination. The latter measurement will ordinarily be easiest to perform when the sample is in a fully inflated condition. Alternatively, a sufficiently accurate approximation for an inflated sample is $$N_m = N_i \simeq \frac{1}{d^3}$$

where $d$ is the average cell diameter. The value obtained can then be used to calculate $N_c$ from the equation $N_c = N_m(\rho_c/\rho_m)$.

From simple geometrical arguments, it can be shown that the quantity $N_i \cdot s^{3/2}$ is quite insensitive to cell geometry, and ranges only from 13.7 to 15.8 for fully inflated closed cell structures with assumed shapes ranging from square to hexagonal cross sections and ratios of length to width up to 2:1. Even a grossly disproportionate cell elongation ratio of 5:1 would only provide a $N_i \cdot s^{3/2}$ quantity of 20.7. Therefore the restriction that $N_c \cdot s^{3/2} > 30$ requires that the cell walls have been crumpled and the structures collapsed so that the number of cells per cc. is at least twice that of the fully inflated structures, i.e. the product can be reinflated to at least twice its collapsed volume without generating any new cells or appreciably stretching any of the pre-formed crumpled walls existing in the partially collapsed structures. The preferred collapsed products will have $N_c \cdot s^{3/2}$ values greater than 60, i.e. can be post-reinflated to at least 4 times their collapsed volume.

The collapsed metastable structures of the invention are unique in their ability to be self-inflated by heat to low density products which exhibit remarkable stability to widely varying environmental conditions. In expanded form little permanent loss is experienced in the mass of the air and inflatant contents within the cells even though a sample be subjected to a sustained load or be heated to temperature approaching the polymer softening point. As a packaging material for cushioning fragile articles, shock absorbency is provided by the compressability of the gaseous contents. Even if heated in the absence of air to displace the air contained within the cells, a structure will continue to retain its expanded condition by virtue of the internal pressure of the residual inflatant vapor.

As regards the provision of collapsed self-inflatable materials, the invention makes possible the economical production of microcellular structures at one central location while still taking advantage of storing and shipping the products in a substantially lower bulk form. Other advantages which also accrue from this technique include, for example, the fact that the collapsed structures will exhibit a volume expansion of at least 2 times upon mere exposure to air at an elevated temperature and/or a simple plasticizer treatment. Therefore, the collapsed structures can be placed inside a confining shape such as an airplane wing, refrigerator door, life jacket cover, etc., followed by exposing the sample to air and heating, whereupon the expansion will completely fill (and reinforce, if adhesives or thermal bonding is employed) the confining structures. A further advantages lies in the fact that the structures can be preshaped, for example by the extrusion process itself, before they are collapsed so that the identical shape is regenerated on subsequent self-expansion. The microcellular structures can be extruded in the form of sheet materials, filamentary materials, rods, tubes, etc.

Among the numerous modifications which are possible, it will be apparent that the products of the invention can be provided to contain common polymer additives such as dyes, pigments, antioxidants, delusterants, antistatic agents, reinforcing particles, adhesion promoters, removable particles, ion exchange materials, U.V. stabilizers and the like by inclusion of such with the polymer solution prior to extrusion or by other suitable treatments.

The following examples serve to further illustrate this invention. All parts therein are by weight unless otherwise specified.

*Example I*

A mixture of 400 grams polyethylene terephthalate of relative viscosity 60.2 (dried at 110° C. in a vacuum oven), 325 grams methylene chloride (activating liquid) and 70 grams 1,1,2-trichloro-1,2,2-trifluoroethane (impermeant inflatant) is heated in a 1 liter pressure vessel to a temperature of 220° C. and a uniform solution is formed by rotating the pressure vessel end-over-end. The autogenous pressure of 720 p.s.i.g. is increased with nitrogen gas to 800 p.s.i.g. just prior to extrusion through an orifice 0.005 inch diameter by 0.0025 inch long into a region at atmospheric pressure. Flash evaporation of the activating liquid gives an ultramicrocellular filament. The filament, generated at the rate of 1900 y.p.m. is led to windup operated at 2020 y.p.m., and wound on a bobbin under slight tension. Most of the methylene chloride vapor permeates out of the filament between the extrusion orifice and the windup, and the remainder condenses at room temperature, so that a substantially collapsed closed cell filament is woundup directly. The tension of the yarn on the package limits the quantity of air permeating the trifluorotrichloroethane-containing cells and prevents reinflation of the structure. The sample is allowed to stabilize during two days storage at room temperature. The collapsed yarn is now metastable and may be removed from the bobbin (i.e., tension removed) without reinflation occuring. The density of the yarn removed from the outside of the package is 0.12 g./cc., while the still more tightly confined yarn on the inside of the package has an even higher density of 0.23 g./cc. Both of these metastable samples reinflate to a density of 0.046 g./cc. on being heated in a 100° C. air oven. A portion of the collapsed yarn removed from the bobbin and stored under no mechanical restraint at room temperature for one week retains its density of 0.23 g./cc. but inflates to a density of 0.046 g./cc., as before, on being heated only 5 minutes at 100° C. The residual trifluorotrichloroethane content of the inflated cellular material is 4 ml./g. of product (i.e. an internal partial pressure of approximately 145 mm.). The polymer in the cell walls exhibits uniform texture and uniplanar orientation.

The thickness of the cell walls of this sample is 0.22 micron, and the average cell diameter of the inflated sample is 20 microns. From this latter number, $N_i$ (the number of cells per cc. of the inflated sample) is estimated to be $1.3 \times 10^8$ cell/cc., and the average cell surface area is therefore calculated to be $$\left(\frac{0.046}{1.38}\right) \times \frac{2}{2 \times 10^{-5} \times 1.3 \times 10^8} = 2.3 \times 10^{-5} \text{ cm.}^2 \text{ per cell}$$

$N_c$ is estimated from $$N_c = 1.3 \times 10^8 \times \frac{0.23}{0.046} = 6.5 \times 10^8 \text{ cell/cc.}$$

Therefore, $N_c \cdot s^{3/2} = 73$ for this sample.

*Example II*

The procedure of Example I is repeated with the use of different proportions of ingredients in the spinning solution and with variations in the spinning conditions. Thus a mixture of 440 grams polyethylene terephthalate of relative viscosity 51, 400 grams methylene chloride and 109 grams 1,1,2-trichloro-1,2,2-trifluoroethane maintained at a temperature of 210° C. and pressure of 900 p.s.i. is extruded from a twelve hole spinneret wherein each orifice is 3.5 mils in diameters and 6 mils in length. The initially expanded multifibrous structure spontaneously collapses in air and is piddled down into a random batt measuring 0.75 inch thickness. Without any compressive force exerted on the batt, it remains at the original thickness throughout a period of 160 hours. At the end of tha time the strand density is found to be 0.072 g./cc. and its $N_c \cdot s^{3/2}$ value is calculated to be 35. Exposure of the sample to a temperature of 100° C. in an air oven for a few minutes effects a lowering of the strand density to 0.031 g./cc. and an increase in height to 1.5 inches.

*Example III*

A quantity of poly(vinyl chloride) microcellular fibers is prepared with a screw extruder provided with melting and mixing sections. Commercial poly(vinyl chloride) of molecular weight approximately 50,000 (Diamond Alkali "Dacovin" type 3031 compounded of homopolymer of specific viscosity 0.32 as determined by ASTM test D-1243-58T, Method B) is charged at about 190 g./min. to the extruder, simultaneously melted and forwarded to a mixing section where methylene chloride, containing 0.5% of a silica aerogel as a nucleating agent (Monsanto's Santocel 54) and 0.5% butanol as a dispersing aid, is added and mixed to form a 56% poly(vinyl chloride) solution. This solution, at a pressure of 1250 p.s.i.g. and temperature of 174° C. is extruded through a cylindrical orifice 15 mils in diameter by 15 mils long. On exiting into the atmospheric pressure region, the superheated solution flash evaporates, generating a fully inflated closed cell microcellular poly(vinyl chloride) foam strand. This strand collapses within a short time (probably due to outward diffusion and/or condensation of the methylene chloride as the sample cools to room temperature, thus decreasing the gas pressure inside the closed polyhedral shaped thin-walled cells), the strand reaching a stable collapsed density of 0.213 g./cc.

Subsequently a quantity of impermeant inflatant is introduced into the cells of this strand to create an osmotic driving force for air to permeate into the cells and reinflate the microcellular structure. This is accomplished by immersing the sample in a refluxing bath of 25 volume percent perfluorocyclobutane/75 volume percent fluorodichloromethane for 30 minutes. The fluorodichloromethane acts to plasticize the polymeric cell walls to allow the perfluorocyclobutane (impermeant inflatant) to enter the cells. The sample is removed from the bath and divided into two portions, A and B. Portion A is allowed to "dry" for about 20 minutes in an external atmosphere of perfluorocyclobutane, i.e. the sample is kept out of contact with air until the fluorodichloromethane plasticizer has evaporated, leaving the sample only slightly inflated by the perfluorocyclobutane trapped inside the cells. At this point the sample is metastable, i.e. it may be exposed for an indefinite period to air at room temperature, but it remains partially collapsed at a density of 0.138 g./cc. since the cell walls have been "set" in crumpled, collapsed condition and they resist continued inward permeation of air to prevent full reinflation. This particular sample reinflates on the following day by a factor of 10.4 to an expanded density of 0.0133 g./cc. when the cell walls are plasticized by a 60 second dip in a 7/1 (volume) bath of fluorodichloromethane/perfluorocyclobutane followed by a 60 second heat treatment in air at 66° C. (A somewhat smaller reinflation factor is obtained if pure fluorodichloromethane is employed as the plasticizing bath, presumably because it is then "too good" a plasticizer, e.g. an appreciable portion of the impermeant inflatant gas in the cells escapes into the bath, thus decreasing the osmotic driving force for air subsequently to permeate into and reinflate the cells.) Note that this particular plasticized sample is reinflatable at only 66° C., almost 10° C. below Tg for the unplasticized polymer. Reinflation of similar perfluorocyclobutane-containing poly(vinyl chloride) samples which are not chemically plasticized may be accomplished by heating alone, using temperatures greater than 75° C.

The Portion B sample from the perfluorocyclobutane-introduction bath is allowed to dry in air at room temperature. In this case some air is able to permeate into the cells before all the plasticizer evaporates to "set" the structure in a not-quite-so-collapsed state metastable at room temperature at a density of 0.082 g./cc. When this sample is activated to allow self-reinflation a day later by the same plasticizer/heat treatment used with Portion A, it reinflates by a factor of 8.7 to reach a stable density of 0.0094 g./cc.

I claim:

1. A metastable self-reinflatable microcellular structure composed of a high molecular weight synthetic organic polymer having a glass transition temperature of at least 40° C. wherein the structure has a major proportion of closed, at least partially collapsed but unruptured polyhedral cells defined by air permeable walls having a thickness of less than 2 microns with essentially all the polymer constituting cell walls said cellular structure being further characterized as being self-reinflatable to less than one-half its collapsed density without substantial stretching of the cell walls by having an $N_c \cdot s^{3/2}$ product greater than about 30, wherein $N_c$ is the number of cells per cc. in the collapsed structure and $s$ is the average cell surface area in square centimeters, said cells containing an impermeant inflatant whose permeability coefficient for diffusion through said walls is essentially zero, said impermeant inflatant being capable of generating a vapor pressure of at least 30 mm. Hg at a temperature below the softening point of the said polymer.

2. The microcellular structure of claim 1 having at least $10^3$ cells/cc.

3. The microcellular structure of claim 2 in the form of filamentary material.

4. The microcellular structure of claim 2 in the form of sheet material.

5. The microcellular structure of claim 1 wherein said synthetic polymer is polyethylene terephthalate.

6. The microcellular structure of claim 5 wherein said impermeant inflatant is 1,1,2-trichloro-1,2,2-trifluoroethane.

7. The microcellular structure of claim 1 wherein the polymer is crystalline and the cell walls exhibit uniform texture and uniplanar orientation.

No references cited.

MURRAY TILLMAN, *Primary Examiner.*

J. C. BLEUTGE, *Assistant Examiner.*